(12) United States Patent
Kim

(10) Patent No.: US 6,989,644 B2
(45) Date of Patent: Jan. 24, 2006

(54) REGENERATIVE BRAKING SYSTEM AND METHOD USING AIR CONDITIONING SYSTEM OF ELECTRIC VEHICLE

(75) Inventor: Tae Woo Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/738,292

(22) Filed: Dec. 16, 2003

(65) Prior Publication Data

US 2005/0007049 A1    Jan. 13, 2005

(30) Foreign Application Priority Data

Jul. 7, 2003    (KR)    ............... 10-2003-0045718

(51) Int. Cl.
*H02P 3/14*    (2006.01)
*B60K 1/00*    (2006.01)
*B61C 9/38*    (2006.01)

(52) U.S. Cl. ............... 318/376; 318/375; 318/362; 318/254; 290/9; 290/11; 290/14; 180/65.3; 180/65.4; 180/65.1

(58) Field of Classification Search ............... None
See application file for complete search history.

(56) References Cited

U.S. PATENT DOCUMENTS

| | | | | |
|---|---|---|---|---|
| 1,985,641 A | * | 12/1934 | Krapf et al. ............... 307/155 |
| 4,433,278 A | * | 2/1984 | Lowndes et al. ........... 320/116 |
| 4,990,837 A | * | 2/1991 | Ishitobi ....................... 318/375 |
| 5,061,883 A | * | 10/1991 | Asano et al. ............... 318/362 |
| 5,291,960 A | * | 3/1994 | Brandenburg et al. ..... 180/65.2 |
| 5,322,352 A | * | 6/1994 | Ohno et al. ................... 303/3 |
| 5,505,251 A | * | 4/1996 | Sarbach ....................... 165/202 |
| 5,507,153 A | * | 4/1996 | Seto et al. ..................... 62/133 |
| 5,557,181 A | * | 9/1996 | Naito et al. ................. 318/376 |
| 5,877,600 A | * | 3/1999 | Sonntag ....................... 318/139 |
| 5,898,282 A | * | 4/1999 | Drozdz et al. ............... 318/139 |
| 5,941,328 A | * | 8/1999 | Lyons et al. ................ 180/65.1 |
| 5,971,088 A | * | 10/1999 | Smith ........................... 180/165 |
| 5,986,416 A | * | 11/1999 | Dubois ........................ 318/139 |
| 6,213,571 B1 | * | 4/2001 | Yamada et al. ............... 303/152 |
| 6,318,487 B2 | * | 11/2001 | Yanase et al. .............. 180/65.2 |
| 6,414,401 B1 | * | 7/2002 | Kuroda et al. ............. 290/40 C |
| 6,439,347 B2 | * | 8/2002 | Suga et al. .................. 187/290 |
| 6,464,027 B1 | * | 10/2002 | Dage et al. ................. 180/65.2 |
| 6,480,767 B2 | * | 11/2002 | Yamaguchi et al. ........... 701/22 |
| 6,637,530 B1 | * | 10/2003 | Endo et al. ................. 180/65.2 |
| 6,724,165 B2 | * | 4/2004 | Hughes ....................... 318/376 |
| 6,737,822 B2 | * | 5/2004 | King ............................ 318/375 |
| 6,740,987 B2 | * | 5/2004 | Kitajima et al. ........... 290/40 C |
| 6,744,237 B2 | * | 6/2004 | Kopf et al. ................... 320/104 |
| 6,752,226 B2 | * | 6/2004 | Naito et al. ................. 180/65.3 |
| 2002/0092310 A1 | * | 7/2002 | Murase et al. ................ 62/133 |
| 2002/0195285 A1 | * | 12/2002 | Egami ......................... 180/53.8 |

FOREIGN PATENT DOCUMENTS

| | | |
|---|---|---|
| JP | 06-319205 | 11/1994 |
| JP | 3353299 | 12/2002 |

* cited by examiner

*Primary Examiner*—David Martin
*Assistant Examiner*—Elias B. Hiruy
(74) *Attorney, Agent, or Firm*—Morgan Lewis & Bockius LLP

(57) ABSTRACT

The regenerative braking method and system for an electric vehicle in which regeneration current is calculated and controlled using control of an air conditioning system to consume a portion or all of the surplus regeneration power, thereby enhancing braking performance and feel. Control includes calculation of a regeneration current and comparison of the regeneration current to battery current to calculate the surplus regeneration power.

14 Claims, 2 Drawing Sheets

REGENERATIVE BRAKING SYSTEM AND METHOD USING AIR CONDITIONING SYSTEM OF ELECTRIC VEHICLE

CROSS-REFERENCE TO RELATED APPLICATIONS

This application claims priority of Korean Application No. 10-2003-0045718, filed on Jul. 7, 2003, the disclosure of which is incorporated fully herein by reference.

1. Field of the Invention

The present invention generally relates to a regenerative braking system, and more particularly, to a regenerative braking method using an air conditioning system of an electric vehicle.

2. Background of the Invention

Generally, electric vehicles having an electric drive source such as an electric motor can be braked through regenerative braking, i.e. the vehicle can be braked while the motor acts as a generator. The motor converts some of the vehicle's kinetic energy to electric energy, and the generated electric energy is stored in a battery while the vehicle is being braked.

If the motor is used as the generator while the vehicle is being braked, the motor produces counter-torque. Accordingly, the kinetic energy of the vehicle is decreased, so that the vehicle speed decreases. Regenerative energy that is produced during braking is converted to direct current (battery charge current) by an inverter, and a battery is charged by the converted direct current. That is, in the electric vehicle, some of vehicle's kinetic energy is recycled through the regenerative braking so that energy efficiency of the electric vehicle is improved. Such regenerative braking is one of the advantages of an electric vehicle.

Regenerative braking, however, can have a limitation in that the battery charge current may give a different braking feeling to the driver. In order to improve regenerative braking performance and feeling, a system for detecting regenerative braking amount and increasing or decreasing pressure of a hydraulic braking system is being developed. However, there is a problem in that a device for regulating a pressure of the hydraulic braking system and a brake control unit (BCU) performing control relating the regenerative braking are additionally needed, and controls of the same are quite complicated.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a regenerative braking system and method using an air conditioning system of an electric vehicle which enables improvement of brake efficiency and makes braking feeling consistent.

In a preferred embodiment of the present invention, the regenerative braking method for an electric vehicle comprises: determining whether a brake of the electric vehicle is operating; calculating a regeneration current based on a brake operation value if it is determined that the brake is operating; determining whether the regeneration current is greater than a battery current limit; calculating a surplus regeneration power if it is determined that the regeneration current is greater than the battery current limit; and controlling an air conditioning system to consume a portion or all of the surplus regeneration power.

It is preferable that calculating the surplus regeneration power comprises: calculating a surplus regeneration current by subtracting the battery current limit from the regeneration current; and calculating the surplus regeneration power by multiplying the surplus regeneration current by a battery voltage.

It is also preferable that control of the air conditioning system comprises steps of: calculating consumable power an air heating device of the air conditioning system that can be currently consumed by the air heating device; determining whether the surplus regeneration power is less than the calculated consumable power of the air heating device; and controlling the air heating device to consume all of the surplus regeneration power, if it is determined that the surplus regeneration power is less than the consumable power of the air heating device.

Preferably, the consumable power of the air heating device is calculated based on a current duty of the air heating device and a rated power of the air heating device.

It is preferable that the consumable power of the air heating device is calculated by multiplying a difference between a maximum duty and the current duty of the air heating device by the rated power of the air heating device.

It is preferable that the control of the air heating device comprises steps of: determining a duty of the air heating device as a duty in which all of the surplus regeneration power can be consumed by the air heating device; and outputting a driving signal corresponding to the determined duty of the air heating device to the air heating device.

Preferably, the duty of the air heating device is determined by summing a current duty of the air-heating device and a duty for the air heating device to consume the surplus regeneration power.

It is preferable that control of the air conditioning system further comprises steps of determining a duty of the air heating device as a maximum duty, if it is determined that the surplus regeneration power is not less than the calculated consumable power of the air heating device.

It is further preferable that control of the air conditioning system further comprises steps of: calculating consumable power of an air cooling device of the air conditioning system that can be currently consumed by the air cooling device, after determining the duty of the air heating device as the maximum duty; determining whether a remaining portion of the surplus regeneration power that has not been consumed by the air heating device is less than the calculated consumable power of the air cooling device; and controlling the air cooling device to consume all of the remaining portion of the surplus regeneration power, if it is determined that the remaining portion of the surplus regeneration power is less than the consumable power of the air cooling device.

Preferably, the consumable power of the air cooling device is calculated based on a current duty of the air cooling device and a rated power of the air cooling device.

It is preferable that the consumable power of the air cooling device is calculated by multiplying a difference between a maximum duty and the current duty of the air cooling device by the rated power of the air cooling device.

It is also preferable that the controlling the air cooling device comprises: determining a duty of the air cooling device as a duty in which all of the remaining portion of the surplus regeneration power can be consumed by the air cooling device; and outputting a driving signal corresponding to the determined duty of the air heating device to the air cooling device.

Preferably, the duty of the air cooling device is determined by summing a current duty of the air cooling device and a duty for the air cooling device to consumed the remaining portion of the surplus regeneration power.

It is preferable that the controlling the air conditioning system further comprises determining a duty of the air cooling device as a maximum duty, if it is determined that the remaining portion of the surplus regeneration power is not less that the calculated consumable power of the air cooling device.

In a preferred embodiment of the present invention, the regenerative braking system for an electric vehicle comprises a motor, an inverter, a battery, an air conditioning system, and a control unit. The motor is capable of generating a regeneration energy while the electric vehicle is being braked, and the inverter converts the regeneration energy generated by the motor to a regeneration current. The battery is configured to be charged by the regeneration current, and an air conditioning system is operated by a current of the battery or the regeneration current. The control unit controls an operation of the air conditioning system. It is preferable that the control unit is programmed to perform any of the regenerative braking methods that are stated above.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
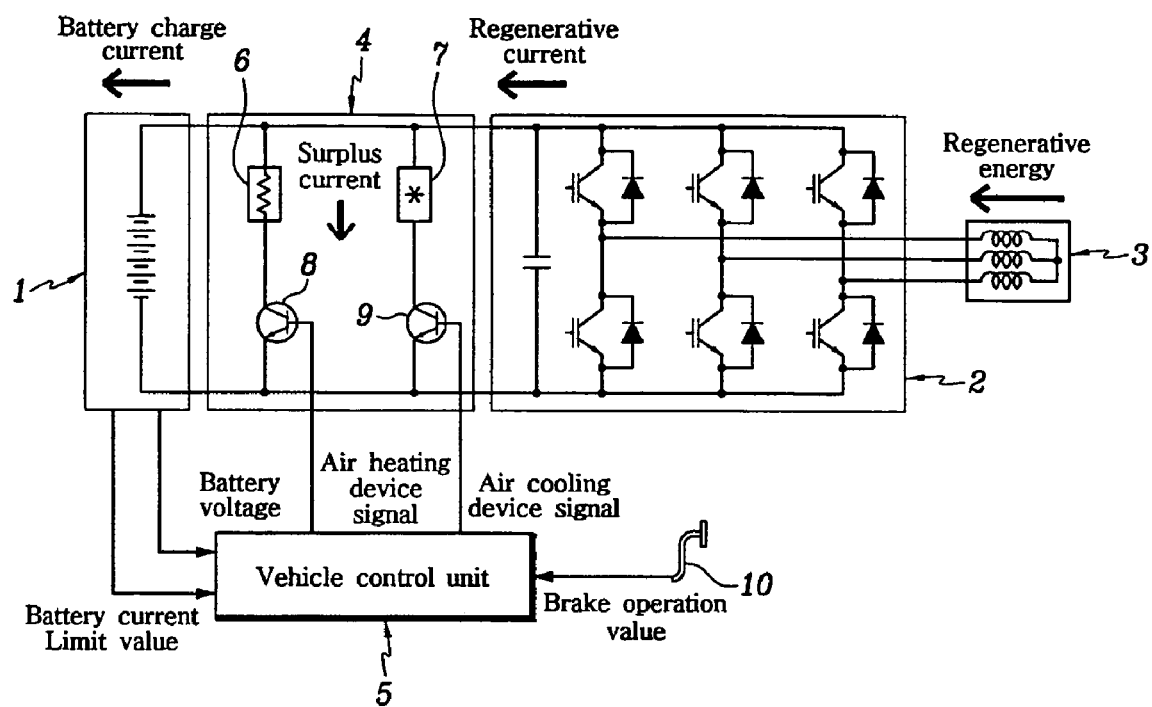
FIG. 1 is a schematic diagram of a regenerative braking system using an air conditioning system of an electric vehicle according to a preferred embodiment of the present invention.

As shown in FIG. 1, the regenerative braking system for an electric vehicle according to the preferred embodiment of the present invention includes a motor 3, an inverter 2, a battery 1, an air conditioning system 4, and a vehicle control unit 5 The motor 3 is mounted in an electric vehicle, and it is used as a generator to produce regenerative energy while the vehicle is being braked. The inverter 2 converts the regenerative energy produced by the motor 3 to direct current, i.e., regeneration current. The battery 1 is charged by the regeneration current converted by the inverter 2. The air conditioning system 4 includes an air heating device 6, an air cooling device 7, and the like. The vehicle control unit 5 is configured to receive information regarding the battery 1 and a brake operation value (or a brake depth value) and to output an air heating device signal and an air cooling device signal. The vehicle control unit 5 controls the air conditioning system 4 such that the air conditioning system 4 consumes surplus regeneration power.

Reference numeral 8 denotes an air heating device switch, and reference numeral 9 denotes an air cooling device switch.

The regenerative braking system according to the preferred embodiment of the present invention can improve braking performance using a prior electric vehicle without adding an additional brake hydraulic pressure control device.

The air conditioning system 4 is driven by electric energy to regulate the temperature in a passenger compartment, which is different from that of a conventional vehicle having a gasoline engine. The air conditioning system 4 is configured to operate responding to a user's manipulation.

The fundamental idea of the present invention is to maintain a driver's brake feeling when depressing a brake pedal. To realize this idea, a portion of electric energy produced by the motor 3 is consumed by the air conditioning system 4, without decreasing an amount of regenerative energy by a limitation of a charge current of the battery 1.

That is, if a regenerative current produced by the motor 3 is greater than a battery charge current limit, the vehicle control unit 5 controls the air heating device 6 and the air cooling device 7 such that the air conditioning system 4 consumes a surplus regenerative current, which is a portion of the regenerative current that remains after charging the battery 1.

The vehicle control unit 5 outputs an air heating device signal and an air cooling device signal for respectively controlling the air heating device 6 and the air cooling device 7, based on brake operation value information input from the brake 10 and battery information such as a battery current limit value and a battery voltage.

Figure 2:
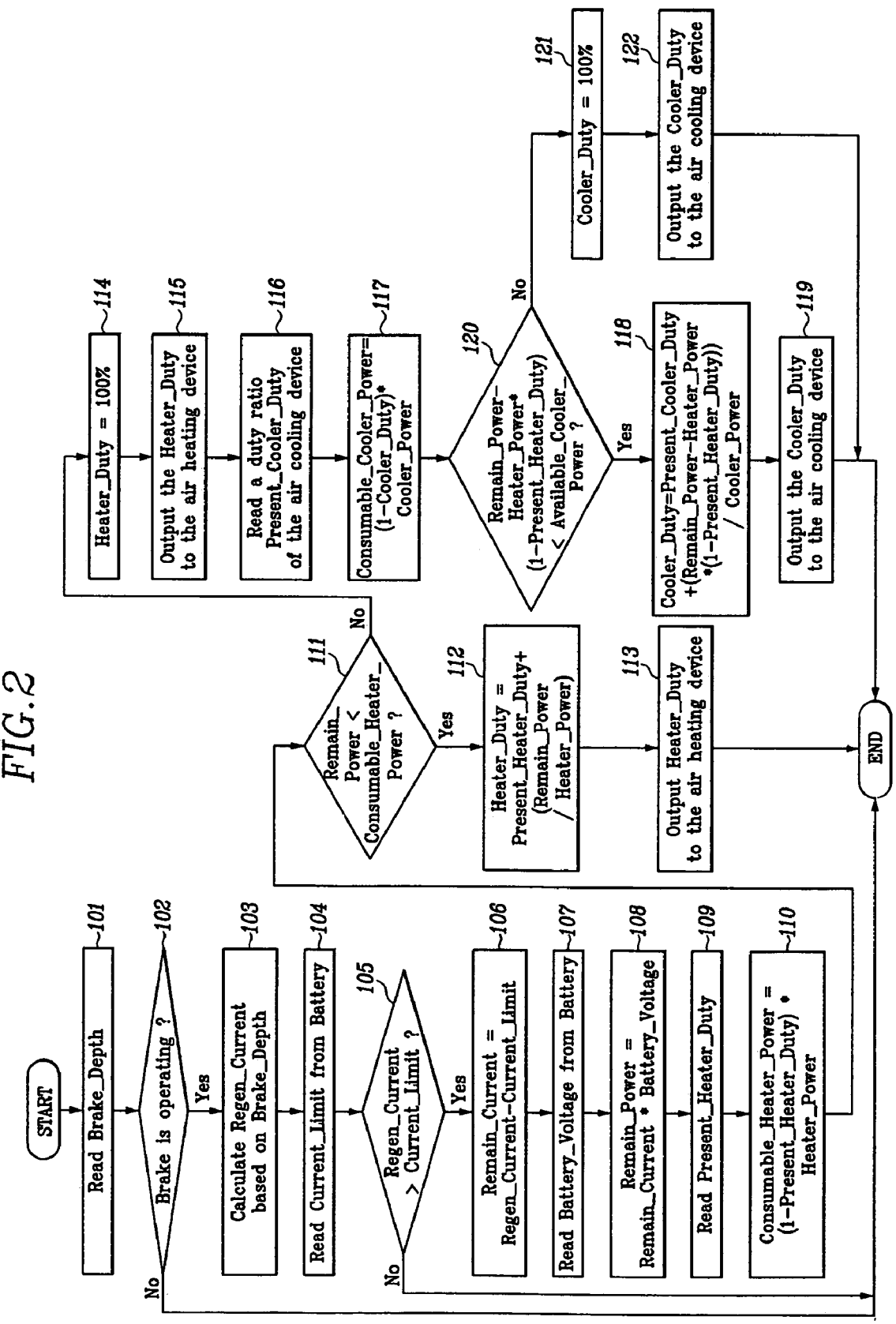
FIG. 2 is a flowchart of a regenerative braking method using an air conditioning system of an electric vehicle according to a preferred embodiment of the present invention.

Referring to FIG. 2, the regenerative braking method according to the preferred embodiment of the present invention will be explained hereinafter.

First, in step 101, the vehicle control unit 5 reads a brake operation value Brake_Depth from the brake 10. The brake operation value indicates a brake pedal position, that is brake depth. For example, the brake operation value can be detected by a brake pedal position sensor, and the vehicle control unit 5 receives a signal representing a depth of a brake pedal from the brake pedal position sensor.

Then, the vehicle control unit 5 determines whether the brake 10 is operated in step 102. This determination can be performed using the brake operation value Brake_Depth. For example, if the brake operation value Brake_Depth is not equal to zero, it can be determined that the brake 10 is operated. If the brake 10 is not operated, that is, if a driver does not depress the brake 10, the control procedure ends.

On the other hand, if it is determined that the brake 10 is operating in step 102, a regeneration energy control is started. That is, the vehicle control unit 5 calculates a regeneration current (i.e., an amount of regenerative braking) Regen_Current based on the brake operation value Brake_Depth in step 103. The calculation of the regeneration current is well known in the art, so further explanation thereof will be omitted.

Then, in step 104, the vehicle control unit 5 reads a battery current limit Current_Limit from the battery 1.

The vehicle control unit 5 determines, in step 105, whether the regeneration current Regen_Current is greater than the battery current limit Current_Limit. If it is determined that the regeneration current Regen_Current is not greater than the battery current limit Current_Limit, all the regeneration current that will be produced by the motor 3 can be used for charging the battery 1. Therefore, in such case, the control procedure ends.

However, if the regeneration current Regen_Current is greater than the battery current limit Current_Limit, the air conditioning system 4 is controlled to consume a remaining current (a surplus current), which is calculated by subtracting the battery current limit Current_Limit from the regeneration current Regen_Current.

A concrete example of this control strategy will be explained in detail hereinafter.

At first, in step 106, the vehicle control unit 5 calculates a surplus current Remain_Current by subtracting the battery current limit Current_Limit from the regeneration current Regen_Current.

The vehicle control unit 5 reads a battery voltage Battery_Voltage from the battery 1 in step 107, and calculates a surplus power Remain_Power by multiplying the surplus current Remain_Current by the battery voltage Battery_Voltage in step 108.

The surplus power is controlled to be consumed by the air conditioning system 4. In this case, if the air heating device 6 or the air cooling device 7 is already operating, an amount of power that can be consumed by the air conditioning system 4 is accordingly restricted. Therefore, the amount of power that is consumed by the air heating device 6 and the air cooling unit 7 must be determined.

Therefore, in step 109, the vehicle control unit 5 reads a present duty ratio Present_Heater_Duty of the air heating device 6. Here, the duty ratio of the air heating device 6 is a control value for operating the air heating device 6 that is set by a user, and it can be read from a control algorithm of the air conditioning system 4. More concretely, the duty ratio of the air heating device 6 is a ratio of a currently consumed power of the air heating device 6 and a rated power of the air heating device 6.

In step 110, the vehicle control unit 5 calculates a currently consumable power Consumable_Heater_Power of the air heating device 6, based on the duty ratio Present_Heater_Duty.

The currently consumable power of the air heating device 6 can be calculated by multiplying a difference between a maximum duty ratio (1 or 100%) and the present duty ratio Present_Heater_Duty of the air heating device 6 by a rated power Heater_Power of the air heating device 6. That is, the currently consumable power Consumable_Heater_Power can be calculated as follows:

Consumable_Heater_Power=(1-Present_Heater_duty)*Heater_Power.

Then, in step 111, the vehicle control unit 5 determines whether the surplus power Remain_Power is less than the currently consumable power Consumable_Heater_Power of the air heating device 6. If the determination in step 111 is affirmative, that is, if it is determined that all the surplus power can be consumed by the air heating unit 6, the vehicle control unit 5 calculates a duty ratio Heater_Duty of the air heating device 6 in step 112.

The Heater_Duty can be calculated as follows:

Heater_Duty=Present_Heater_Duty+(Remain_Power/Heater_Power)

where a value of Remain_Power/Heater_Power is a duty ratio for allowing the surplus power Remain_Power to be consumed by the air heating device 6. That is, the duty ratio Heater_Duty of the air heating device 6 is determined as a sum of the current duty and a duty for consuming the surplus regeneration power.

Then, in step 113, the vehicle control unit 5 outputs the calculated Heater_Duty to the air heating device 6 as the air heating device signal. The air heating device is subsequently operated according to the calculated Heater_Duty.

On the other hand, if the determination in the step 111 is negative, that is, if it is determined that all the surplus power cannot be consumed by the air heating device 6, the surplus power is consumed according to the following process.

The vehicle control unit 5 determines a duty ratio Heater_Duty of the air heating device 6 as a full duty (i.e., 100%) in step 114, and outputs the 100% duty ratio to the air heating device 6 as the air heating device signal in step 115. That is, the air heating device 6 is controlled to consume its rated power.

Then, in step 116, the vehicle control unit 5 reads a duty ratio Present_Cooler_Duty of the air cooling device 7. Here, the duty ratio of the air cooling unit 7 is a value that is set by a user, and it can be read from a control algorithm of the air conditioning system 4. More concretely, the duty ratio of the air cooling device 7 is a ratio of a currently consumed power of the air cooling device 7 and a rated power of the air cooling device 7.

The vehicle control unit 5, in step 117, calculates a currently consumable power Consumable_Cooler_Power of the air cooling device 7 using the duty ratio Present_Cooler_Duty.

The Consumable_Cooler_Power can be calculated by multiplying a difference between a maximum duty ratio 100% and the duty ratio Present_Cooler_Duty by a rated power Cooler_Power of the air cooling device 7.

Then, in step 120, the vehicle control unit 5 determines whether a remaining portion of the surplus power Remain_Power that was not consumed by the air heating device 6 is less than the currently consumable power Consumable_Cooler_Power of the air cooling device 7. The remaining portion of the surplus power can be calculated by subtracting a portion of the surplus power that was consumed by the air heating device 6 from the whole of the surplus Remain_Power. Here, the portion of the surplus power that was consumed by the air heating device 6 is equal to "Heater_Power*(1-Present_Heater_Duty)", and therefore the remaining portion of the surplus power is equal to "Remain_Power − Heater_Power*(1-Present_Heater_Duty)". Accordingly, in step 120, it is determined whether the value of "Remain_Power-Heater_Power*(1-Present_Heater_Duty)" is less than the Consumable_Cooler_Duty.

If the determination in step 120 is affirmative, the vehicle control unit 5 determines a duty Cooler_Duty of the air cooling device 7 in step 118.

Here, the Cooler_Duty is calculated by summing the Present_Cooler_Duty and a duty of the air cooling device 7 for consuming the remaining portion of the surplus power that was not be consumed by the air heating device 6.

That is, the Cooler_Duty of the air cooling device 7 is determined as follows:
Cooler_Duty=Present_Cooler_Duty+(Remain_Power-Heater_Power*(1-Present_Heater_Duty))/Cooler_$_{Power}$.

Then, in step 119, the vehicle control unit 5 outputs the calculated Cooler_Duty to the air cooling device 7 as the air cooling device signal.

On the other hand, it the determination in step 120 is negative, the vehicle control unit 5 determines a duty ratio of the air cooling device 7 as a full duty ratio (i.e., 100%) in step 121, and outputs the 100% duty ratio to the air cooling device 7 as the air cooling device signal in step 122. That is, the air cooling device 7 is controlled to consume its rated power.

If the regenerative braking method according to the preferred embodiment of the present invention is applied, a driver's brake feeling can be maintained to be consistent, and some portion of energy is electrically consumed instead of being mechanically consumed so that abrasion of a brake pad can be decreased.

Furthermore, even when the air conditioning system 4 including the air heating device 6 and the air cooling device 7 is already operating, the regenerative braking method according to the preferred embodiment of the present invention can be applied.

In the regenerative braking system and method according to the preferred embodiments of the present invention, an efficiency of the brake can be improved because the regenerative energy is not restricted during the regenerative braking.

Furthermore, the driver's braking feeling can be maintained to be consistent.

Still furthermore, an efficiency of the brake can be improved without a separate brake control unit, and thereby a number of parts of the brake system can be decreased and cost for manufacturing the brake system can be decreased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A regenerative braking method for an electric vehicle, comprising:
    determining whether a brake of the electric vehicle is operating;
    calculating a regeneration current based on a brake operation value if it is determined that the brake is operating;
    determining whether the regeneration current is greater than a battery current limit;
    calculating a surplus regeneration power if it is determined that the regeneration current is greater than the battery current limit; and
    controlling an air conditioning system to consume a portion or all of the surplus regeneration power, wherein the controlling the air conditioning system comprises:
    calculating consumable power of an air heating device of the air conditioning system that can be currently consumed by the air heating device;
    determining whether the surplus regeneration power is less than the calculated consumable power of the air heating device; and
    controlling the air heating device to consume all of the surplus regeneration power, if it is determined that the surplus regeneration power is less than the consumable power of the air heating device; and wherein the consumable power of an air heating device is calculated based on a current duty of the air heating device and a rated power of the air heating device.

2. The regenerative braking method of claim 1, wherein the calculating a surplus regeneration power comprises:
    calculating a surplus regeneration current by subtracting the battery current limit from the regeneration current; and
    calculating the surplus regeneration power by multiplying the surplus regeneration current by a battery voltage.

3. The regenerative braking method of claim 1, wherein the consumable power of the air heating device is calculated by multiplying a difference between a maximum duty ratio and the current duty ratio of the air heating device by the rated power of the air heating device.

4. The regenerative braking method of claim 1, wherein the controlling the air heating device comprises:
    determining a duty ratio of the air heating device as a duty ratio in which all of the surplus regeneration power can be consumed by the air heating device; and
    outputting a driving signal corresponding to the determined duty ratio of the air heating device to the air heating device.

5. The regenerative braking method of claim 4, wherein the duty ratio of the air heating device is determined by summing a current duty ratio of the air heating device and a duty ratio for the air heating device to consume the surplus regeneration power.

6. The regenerative braking method of claim 1, wherein the controlling the air conditioning system further comprises determining a duty ratio of the air heating device as a maximum duty ratio, if it is determined that the surplus regeneration power is not less than the calculated consumable power of the air heating device.

7. The regenerative braking method of claim 1, wherein the controlling the air conditioning system further comprises:
    calculating an amount of power that can be currently consumed by the air cooling device, after determining the duty ratio of the air heating device as the maximum duty;
    determining whether a remaining portion of the surplus regeneration power that has not been consumed by the air heating device is less than the calculated consumable power of the air cooling device; and
    controlling the air cooling device to consume all of the remaining portion of the surplus regeneration power, if it is determined that the remaining portion of the surplus regeneration power is less than the consumable power of the air cooling device.

8. The regenerative braking method of claim 7, wherein the consumable power of the air cooling device is calculated based on a current duty ratio of the air cooling device and a rated power of the air cooling device.

9. The regenerative braking method of claim 8, wherein the consumable power of the air cooling device is calculated by multiplying a difference between a maximum duty ratio and the current duty ratio of the air cooling device by the rated power of the air cooling device.

10. The regenerative braking method of claim 7, wherein the controlling the air cooling device comprises:
    determining a duty ratio of the air cooling device as a duty ratio in which all of the remaining portion of the surplus regeneration power can be consumed by the air cooling device; and
    outputting a driving signal corresponding to the determined duty ratio of the air heating device to the air cooling device.

11. The regenerative braking method of claim 10, wherein the duty ratio of the air cooling device is determined by summing a current duty ratio of the air cooling device and a duty ratio for the air cooling device to consume the remaining portion of the surplus regeneration power.

12. The regenerative braking method of claim 7, wherein the controlling the air conditioning system further comprises determining a duty ratio of the air cooling device as a maximum duty if it is determined that the remaining portion of the surplus regeneration power is not less that the calculated consumable power of the air cooling device.

13. A regenerative braking method for an electric vehicle, comprising:

determining whether a brake of the electric vehicle is operating;

calculating a regeneration current based on a brake operation value if it is determined that the brake is operating;

determining whether the regeneration current is greater than a battery current limit;

calculating a surplus regeneration power if it is determined that the regeneration current is greater than the battery current limit; and controlling an air conditioning system to consume a portion or all of the surplus regeneration power, wherein the controlling the air conditioning system comprises:

calculating consumable power of an air heating device of the air conditioning system that can be currently consumed by the air heating device;

determining whether the surplus regeneration power is less than the calculated consumable power of the air heating device; and controlling the air heating device to consume all of the surplus regeneration power, if it is determined that the surplus regeneration power is less than the consumable power of the air heating device, wherein the controlling the air heating device comprises:

determining a duty ratio of the air heating device as a duty ratio in which all of the surplus regeneration power can be consumed by the air heating device; and outputting a driving signal corresponding to the determined duty ratio of the air heating device to the air heating device, wherein the duty ratio of the air heating device is determined by summing a current duty ratio of the air heating device and a duty ratio for the air heating device to consume the surplus regeneration power.

14. A regenerative braking method for an electric vehicle, comprising:

determining whether a brake of the electric vehicle is operating;

calculating a regeneration current based on a brake operation value if it is determined that the brake is operating;

determining whether the regeneration current is greater than a battery current limit;

calculating a surplus regeneration power if it is determined that the regeneration current is greater than the battery current limit; and controlling an air conditioning system to consume a portion or all of the surplus regeneration power, wherein the controlling the air conditioning system comprises:

calculating consumable power of an air heating device of the air conditioning system that can be currently consumed by the air heating device;

determining whether the surplus regeneration power is less than the calculated consumable power of the air heating device; and controlling the air heating device to consume all of the surplus regeneration power, if it is determined that the surplus regeneration power is less than the consumable power of the air heating device, wherein the controlling the air conditioning system further comprises:

calculating an amount of power that can be currently consumed by the air cooling device, after determining the duty ratio of the air heating device as the maximum duty;

determining whether a remaining portion of the surplus regeneration power that has not been consumed by the air heating device is less than the calculated consumable power of the air cooling device; and controlling the air cooling device to consume all of the remaining portion of the surplus regeneration power, if it is determined that the remaining portion of the surplus regeneration power is less than the consumable power of the air cooling device.

\* \* \* \* \*